(12) United States Patent
Oh et al.

(10) Patent No.: US 9,338,110 B1
(45) Date of Patent: May 10, 2016

(54) METHOD OF PROVIDING INSTANT MESSAGING SERVICE, RECORDING MEDIUM THAT RECORDS PROGRAM THEREFORE, AND TERMINAL

(71) Applicant: SK PLANET CO., LTD., Gyeonggi-Do (KR)

(72) Inventors: Gilhun Oh, Seoul (KR); Jaeyoung Woo, Gyeonggi-Do (KR)

(73) Assignee: SK PLANET CO., LTD. (KR)

( * ) Notice: Subject to any disclaimer, the term of this patent is extended or adjusted under 35 U.S.C. 154(b) by 0 days.

(21) Appl. No.: 14/410,962

(22) PCT Filed: Feb. 26, 2013

(86) PCT No.: PCT/KR2013/001547
§ 371 (c)(1),
(2) Date: Dec. 23, 2014

(87) PCT Pub. No.: WO2014/123270
PCT Pub. Date: Aug. 14, 2014

(30) Foreign Application Priority Data

Feb. 8, 2013 (KR) .................. 10-2013-0014506
Feb. 26, 2013 (KR) .................. 10-2013-0020366

(51) Int. Cl.
*G06F 15/16* (2006.01)
*H04L 12/58* (2006.01)
(Continued)

(52) U.S. Cl.
CPC ............ *H04L 51/10* (2013.01); *G06F 3/04842* (2013.01); *G06T 11/60* (2013.01);
(Continued)

(58) Field of Classification Search
CPC ............ G06F 3/0484; G06F 17/30867; H04L 29/06387; H04L 51/04; H04L 51/24; H04M 1/72522; H04M 1/72544
USPC ................................................. 709/206, 207
See application file for complete search history.

(56) References Cited

U.S. PATENT DOCUMENTS 7,796,139 B1 * 9/2010 Feierbach ............... G06T 11/60
345/469.1
8,285,785 B2 10/2012 Ekholm et al.
(Continued)

FOREIGN PATENT DOCUMENTS

CN 102664825 A 9/2012
CN 102779027 A 11/2012
(Continued)

OTHER PUBLICATIONS

Office Action issued in corresponding Japanese Application No. 2015-518319 dated Jun. 9, 2015.
(Continued)

*Primary Examiner* — Ruolei Zong
(74) *Attorney, Agent, or Firm* — Baker Hostetler LLP

(57) ABSTRACT

Disclosed are a method of providing an instant messaging service, a recording medium that records a program therefor, and a terminal. A real time camera capture image is output to a background screen of a dialog window for displaying an instant message so that a user can keep his/her eyes forward through the background screen of the dialog window and use an instant messaging service while moving. Moreover, the real time camera capture image is transmitted to a partner in a conversation through the background screen of the dialog window according to the user's simple input so that it is possible for the user to share circumstances around him or her with the partner in real time.

15 Claims, 13 Drawing Sheets

(51) Int. Cl.
*H04N 7/18* (2006.01)
*G06T 11/60* (2006.01)
*G06F 3/0484* (2013.01)

(52) U.S. Cl.
CPC .............. *H04L 51/20* (2013.01); *H04N 7/185* (2013.01); *G06T 2200/24* (2013.01); *G06T 2207/10016* (2013.01); *G06T 2207/30232* (2013.01)

(56) References Cited

U.S. PATENT DOCUMENTS

| | | | |
|---|---|---|---|
| 2005/0132288 A1 | 6/2005 | Kirn et al. | |
| 2005/0146600 A1* | 7/2005 | Chipchase | H04M 1/72522 348/14.02 |
| 2008/0155020 A1 | 6/2008 | Beauchamp et al. | |
| 2010/0050092 A1* | 2/2010 | Williams | G06F 3/0481 715/753 |
| 2011/0119610 A1 | 5/2011 | Hackborn et al. | |
| 2011/0202947 A1* | 8/2011 | Gupta | H04N 21/26266 725/14 |

FOREIGN PATENT DOCUMENTS

| | | |
|---|---|---|
| CN | 102799384 A | 11/2012 |
| EP | 1983748 | 10/2008 |
| EP | 2 642 384 A1 | 9/2013 |
| JP | 2003-274376 | 9/2003 |
| JP | 2004-304297 | 10/2004 |
| KR | 10-0557091 | 3/2006 |
| KR | 1020060039497 | 5/2006 |
| KR | 1020070069551 | 7/2007 |
| KR | 1020090010299 | 1/2009 |

OTHER PUBLICATIONS http://www.newsen.com/news_view.php?uid=201212251046462320; Apr. 29, 2013.
Office Action issued in corresponding Korean Application No. 10-2013-0020366 dated Apr. 29, 2013.
Decision to Grant issued in corresponding Korean Application No. 10-2013-0020366 dated Aug. 23, 2013.
International Search Report issued in corresponding International Application No. PCT/KR2013/001547 dated Nov. 15, 2013.
Rob Lightner, "How to walk safely while using your Android device," Tech Culture, Feb. 8, 2012, XP055211268 (http://www.cnet.com/how-to/how-to-walk-safely-while-using-your-android-device/>.
Bill Ray, "iPhone users to walk and read at same time," May 14, 2009, XP055211272 <http://www.theregister.co.uk/2009/05/14/email_n_walk/>.
Julian Lin et al., "Instant Messaging Acceptance and Use Among College Students," Proceedings of the Pacific Asia Conference on Information Systems (PACIS), 2004, XP055211322 <http://aisel.aisnet.org/cgi/viewcontent.cgi?article=1158&context=pacis2004>.
European Search Report in European Patent Application No. 13874289.5, dated Sep. 30, 2015.
Office Action in Chinese Patent Application No. 201380034856.4, dated Nov. 3, 2015.

* cited by examiner

METHOD OF PROVIDING INSTANT MESSAGING SERVICE, RECORDING MEDIUM THAT RECORDS PROGRAM THEREFORE, AND TERMINAL

CROSS-REFERENCE TO RELATED APPLICATION

This application claims priority to and benefit of Patent Application Serial No. 10-2013-0014506, filed on Feb. 8, 2013 in Korea, which is hereby incorporated by reference herein in its entirety.

BACKGROUND

1. Field of the Invention

The present disclosure relates to an instant messaging service, and more particularly, to a method of providing an instant messaging service in which a real time camera capture image is output to a background screen of a dialog window for displaying an instant message so that it is possible for a user to use the instant messaging service while moving, and to transmit the camera image of the background screen to a partner with simple manipulation, a recording medium that records a program therefor, and a terminal.

2. Discussion of Related Art

Due to the rapid development of information and communication technology, various types of terminals such as mobile communication terminals and personal computers are equipped with various functions.

To describe mobile communication terminals as an example, mobile communication terminals have recently been equipped with various functions such as data communication, capturing photos and videos with a camera, playing music or video files, games, and watching television in addition to a default voice communication function.

Technology for improvement of functions capable of being executed on such a terminal is continuously developing focusing on technology for hardware and software improvement.

Meanwhile, recently, usage frequency of messenger services in which a plurality of users can converse by accessing a communication network using such a terminal and then transmitting and receiving messages has been continuously increasing.

Basically, since such messenger services are communication services based on text messages, it is necessary for users to continuously manipulate a keyboard to input text to be transmitted or to check text transmitted from a partner while using the messenger service. Therefore, accidents are likely to occur when users fail to maintain a forward gaze while using such messenger services on the move.

Moreover, in order to provide various convenient functions to the user, existing messenger services support exchange of various formats of messages such as photos, emoticons, and audio in addition to text messages.

However, in order for a user to transmit a photo while such a messenger service, the user selects the photo from pre-stored photo images and requests transmission of the photo or the user captures a desired image by additionally activating a photo function, selects the captured image and requests transmission of the captured image. Therefore, the user has a problem in that a plurality of key inputs and a complicated manipulation are necessary.

SUMMARY

The invention is provided to improve user convenience when a messenger service is used. Example embodiments of the invention provide a method of providing an instant messaging service in which a real time camera capture image is output to a background screen of a dialog window for displaying an instant message so that it is possible for a user to maintain a forward gaze through the background screen of the dialog window and to use the instant messaging service on the move, a recording medium that records a program therefor, and a terminal.

Example embodiments of the invention also provide a method of providing an instant messaging service in which a real time camera capture image is transmitted to a partner terminal participating a conversation with a simple manipulation, for example, touching the background screen of the dialog window, so that circumstances around a user can be easily shared with a partner while the instant messaging service is used, a recording medium that records a program therefor, and a terminal.

In accordance with some embodiments, a terminal includes a camera unit configured to capture an image, an input unit configured to input a user's input associated with an instant messaging function, a display unit configured to output a user interface screen according to execution of the instant messaging function including a dialog window, and a control unit that is functionally connected to the camera unit, input unit, and display unit, and that performs control such that, while that instant messaging function that transmits and receives instant messages with one or more other terminals is executed, the camera unit is activated according to the user's input for requesting background screen switching, and an image captured by the activated camera unit is displayed in a background screen of the dialog window in which instant messages transmitted or received between the terminal and the one or more other terminals are displayed.

The control unit may transmit a capture image of the camera unit output to the background screen to the one or more other terminals according to the user's input for requesting transmission of the camera image while the image captured by the camera unit is displayed in the background screen of the dialog window.

The control unit may perform control such that, when there is the user's input for requesting transmission of the camera image, the capture image of the camera unit output to the background screen is stored, and the display unit is controlled to display the stored image in the dialog window.

The user's input for requesting transmission of the camera image may include at least one of a predetermined word associated with capturing, transmitting, and sharing that includes any one among click, transmit, take a picture, photograph, share, photo, picture, and capture, a sentence including the word, an initial sound of the word or sentence, and an abbreviation of the word or sentence.

The camera unit may be provided to capture images in a direction opposite to a screen output direction of the display unit such that a forwarding image of the user is captured while the instant messaging function is performed.

The control unit may perform control such that, while the instant messaging function is executed, a first menu is output to switch the background screen of the dialog window to the camera image, the camera unit is activated according to the user's input on the first menu, and the image captured by the activated camera unit is displayed in the background screen of the dialog window.

The control unit may perform control such that, when a screen of the display unit moves to a menu screen or another screen including an initial screen and returns to the dialog window, or when the dialog window is selected after the instant messaging function terminates and is re-executed, a state in which the capture image of the camera unit is output to the background screen of the dialog window is maintained, whereas the control unit may perform control such that the background screen of the dialog window is switched to a general image including a still image or graphic image specified from the capture image of the camera unit according to setting conditions based on at least one of a remaining battery capacity, a power saving mode, and a background waiting time of the instant messaging function.

In accordance with some embodiments, a method of providing an instant messaging service includes checking whether a background screen is switched to a camera image while an instant messaging function in which a terminal transmits and receives an instant message with one or more other terminals is executed, activating a camera unit that is connected to the terminal when it is checked that the background screen is switched to the camera image, and background screen switching for outputting a camera image captured by the activated camera unit to a background screen of a dialog window in which the instant message is displayed.

The method may further include storing the camera image displayed in the background screen of the dialog window according to a user's input.

The method may further include transmitting the camera image displayed in the background screen of the dialog window to the one or more other terminals according to a user's input.

The user's input in the transmitting may include at least one of a predetermined word associated with capturing, transmitting, and sharing that includes any one among click, transmit, take a picture, photograph, share, photo, picture, and capture, a sentence including the word, an initial sound of the word or sentence, and an abbreviation of the word or sentence.

The method may further include displaying the camera image transmitted to the one or more other terminals in the dialog window as a transmitting or receiving message.

The checking may include providing a first menu for switching the background screen of the dialog window to the camera image, and checking whether the background screen is switched based on setting information of the first menu according to a user's input.

In the checking, a predetermined user input may be checked in order to request switching of the background screen of the dialog window to the camera image.

The transmitting may include displaying a second menu for requesting transmission of a capture image when the background screen of the dialog window in which the capture image of the camera unit is displayed is selected, and transmitting the camera image displayed in the background screen to the one or more other terminals according to a user's input on the second menu.

The transmitting may further include focusing on a selected part of the camera image when the background screen of the dialog window in which the capture image of the camera unit is displayed is selected.

The background screen switching may be maintained when a screen of the terminal moves to a menu screen or another screen of the instant messaging function including an initial screen and returns to the dialog window, or when the screen of the terminal returns to the dialog window after the instant messaging function terminates and is re-executed, whereas the background screen switching may be released according to setting conditions based on at least one of a remaining battery capacity, a power saving mode, and a background waiting time of the instant messaging function, and the background screen of the dialog window is switched to a general image including a specified still image or graphic image.

In accordance with some embodiments, a computer-readable recording medium records a program executing the above-described method of providing an instant messaging service.

According to the invention, the real time image captured by the camera is output to the background screen of the dialog window in which the instant message transmitted and received among two or more terminals is displayed so that it is possible for the user to maintain a forward gaze or check circumstances around the user through the background screen of the dialog window while the user communicates with the partner using instant messages.

According to the invention, circumstances in front of the user are checked through the real time capture image of the camera that is displayed in the background screen of the dialog window while the instant messaging service is used so that it is possible to improve user convenience such as using the instant message safely while on the move.

According to the invention, the user checks circumstances in front of him or her through the real time capture image of the camera that is displayed in the background screen of the dialog window while the instant messaging service is used, and transmits the checked camera capture image to the partner terminal in a conversation using only a simple manipulation such as touching the background screen so that it is possible to share various circumstances around the user in real time with the partner in a conversation.

DETAILED DESCRIPTION

Figure 1:
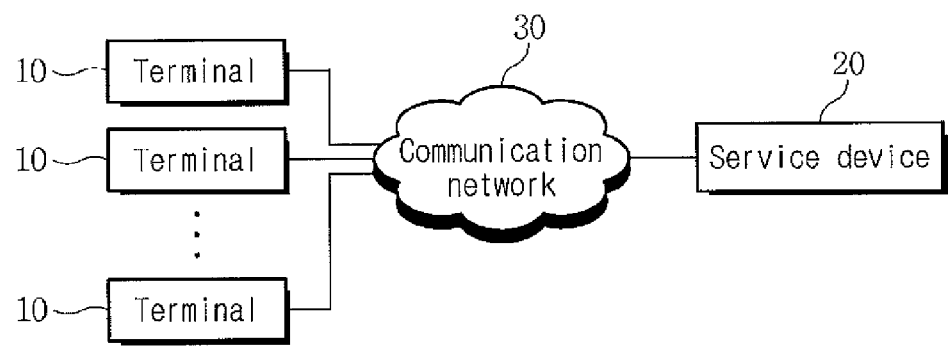
FIG. 1 is a schematic diagram illustrating a configuration of an instant messaging service system according to an embodiment of the invention.

Hereinafter, exemplary embodiments of the invention that are easily performed by those skilled in the art will be described in detail with reference to the accompanying drawings. In detailed descriptions of operation principles of the exemplary embodiments of the invention, when it is determined that detailed descriptions of related well-known functions and configurations unnecessarily obscure the gist of the invention, detailed descriptions thereof will be omitted. This serves to convey the principles of the invention more clearly by omitting unnecessary descriptions. It will be understood that, although the terms first, second, etc. may be used herein to describe various elements, these elements should not be limited by these terms. These terms are used only to distinguish one element from another.

Parts performing similar functions and operations throughout the drawings are denoted by the same reference numerals.

Moreover, a terminal of the invention may be implemented in various forms. Examples of the terminal used in this specification may include a mobile terminal such as a smart phone, a tablet PC, a personal digital assistant (PDA), a portable multimedia player (PMP), or an MP3 player, and a fixed terminal such as a smart TV or a desktop computer. Any device capable of transmitting and receiving messages with another user via a communication network may be used as the terminal of the invention.

Hereinafter, an instant messaging service system according to an embodiment of the invention will be described.

FIG. 1 is a schematic diagram illustrating a configuration of an instant messaging service system according to the embodiment of the invention.

As illustrated in FIG. 1, an instant messaging service system 100 according to the embodiment of the invention may include a plurality of terminals 10, a service device 20, and a communication network 30.

First, the plurality of terminals 10 are devices capable of supporting an instant messaging service for transmitting and receiving instant messages, and sharing content such as a video, a photo, or audio with at least one partner terminal, and are devices that can be used by users. The plurality of terminals 10 may include a messenger program for supporting the instant messaging service.

Here, the messenger program may be provided by the service device 20 and may provide the instant messaging service by interworking with the service device 20. That is, the messenger program refers to a program that performs at least one function among writing instant messages, transmitting and receiving instant messages with at least one partner terminal, displaying instant messages transmitted to or received from at least one partner terminal, and transmitting content such as a video, a photo, or audio.

Although the embodiment of the invention is described focusing on a state in which the messenger program is provided in the plurality of terminals 10, the invention is not limited thereto. The terminal 10 may access the service device 20 and use the messenger program based on cloud computing.

Moreover, the plurality of terminals 10 may access the service device 20 and receive the instant messaging service based on a server. In this case, the messenger program in the plurality of terminals 10 may be replaced by, for example, a web browser.

These terminals 10 may execute the messenger program and display a messenger program execution screen (for example, an initial screen or a dialog window screen). Here, the messenger program may be executed in response to a user's request or when a specific event occurs. The messenger program of the terminal 10 may be executed when the specific event occurs, for example, when a message is received from a partner or specific information is received from the service device 20.

In particular, the terminal 10 according to the embodiment of the invention includes at least one camera or is connected to at least one camera, and thus displays an image capture by the camera. While the messenger program that transmits and receives instant messages with one or more other terminals is executed, the camera is activated by the user's input, and a background screen of a dialog window in which instant messages transmitted or received to or from one or more other terminals are displayed is switched to display a real time image captured by the camera. In this way, the real time image captured by the camera is output to the background screen of the dialog window, and the transmitted or received instant message is displayed on the real time image.

As a result, while the user exchanges instant messages with one or more other terminal users using the dialog window, it is possible to check circumstances ahead of or around the user in real time through the background screen of the dialog window.

Moreover, while one or more other terminal users exchange instant messages using the dialog window, the terminal 10 according to the embodiment of the invention may store the real time camera capture image displayed to the background screen of the dialog window according to the user's input, and transmit the real time camera capture image to the one or more other terminals. In this case, the real time capture image to be stored or to be transmitted may be a still image at a specific time point or a video for a certain time period. Accordingly, while the user exchanges instant messages, it is possible to share circumstances around the user in real time with the partner in a conversation. In this case, a shared capture image may be displayed in the dialog window as a form of a transmitting message or receiving message. Moreover, the terminal 10 transmits the real time capture image output to the background screen of the dialog window to the partner terminal in a conversation so that the image may be displayed in a background screen of a dialog window of the partner terminal. That is, it is possible to synchronize the background screen such that the partner views the same background screen as the user of the terminal 10.

Next, the service device 20 is a server device of a service provider who provides the instant messaging service using the messenger program of the terminal 10, and basically delivers instant messages among the plurality of terminals 10. For example, the service device 20 sets a conversation group in which two or more terminals 10 are registered as participants according to a request from the terminal 10, and delivers instant messages transmitted from a specific terminal 10 included in the conversation group to another terminal included in the conversation group. Moreover, the service device 20 transmits various pieces of content such as a photo, a video, or audio transmitted from the specific terminal 10 included in the conversation group to another terminal included in the conversation group.

In addition, the service device 20 may provide a storage space capable of providing a variety of pieces of information generated in the messenger programs of the plurality of terminals 10 to the terminal 10 using a cloud service method. That is, instant messages or content among two or more users who participate in the conversation group are stored and managed to function as a life DB of users. Here, the content to be stored may include the real time image displayed on the background screen of the terminal 10.

Accordingly, in order to check messages or content exchanged with the partner, the user of the terminal 10 may access the service device 20 and check the messages or content. Here, the access may include an additional procedure, for example, login to the service device 20 using the terminal 10. Without the procedure such as login, a procedure in which the terminal automatically accesses the service device 20 may be included.

On the other hand, messages or content transmitted or received through the instant messaging service may be simultaneously stored in the terminal 10 and the service device 20. According to the user's selection, only a specific message or specific content may be stored in the service device 20.

Moreover, in order to provide the instant messaging service to the plurality of terminals 10, the service device 20 may distinguish subscribed users with a user identifier, and manage a state, a receiving mode, a message recipient list and subscriber environment information with respect to each of the subscribed users, and an instant messaging (IM) conversation session for delivering instant messages among on-line users, that is, messenger setting information including a conversation channel. Furthermore, the service device 20 may perform, for example, a session initiation protocol (SIP) call processing function and a message session relay protocol (MSRP) relay function. Using such a function, it is possible to provide a chat service among the plurality of terminals, for example, between first and second terminals.

Further, the service device 20 according to the invention transmits the real time capture image output to the background screen of the dialog window from the terminal 10 to the partner terminal, and allows the same real time image to be output to the background screens of two or more terminals 10 in a conversation.

The service device 20 may be implemented as a set of various devices in order to support the above-described operations. The service device may include, for example, a database server configured to store and manage various associated pieces of information, a file server configured to process files, or a push server configured to automatically push associated information to the terminal 10.

In addition, the service device may include a variety of servers according to a system design method. Moreover, a function corresponding to the server may also be implemented in one service device 20 as a single module.

The plurality of terminals 10 and the service device 20 according to the embodiment of the invention transmit and receive various associated pieces of information via the communication network 30. In this case, various types of communication networks may be used as the communication network 30.

For example, the communication network 30 may use a wireless communication method such as 3G mobile communication, 4G mobile communication, wireless LAN (WLAN), Wi-Fi, Wibro, Wimax, or high speed downlink packet access (HSDPA), or a wired communication method such as Ethernet, xDSL (ADSL and VDSL), hybrid fiber coaxial cable (HFC), fiber to the curb (FITC), or fiber to the home (FTTH), or a combination thereof. Well-known communication methods or all types of communication methods that will be developed may be included in addition to the above communication methods.

Hereinafter, a main configuration and operation method of the terminal 10 according to the embodiment of the invention will be described.

Figure 2:
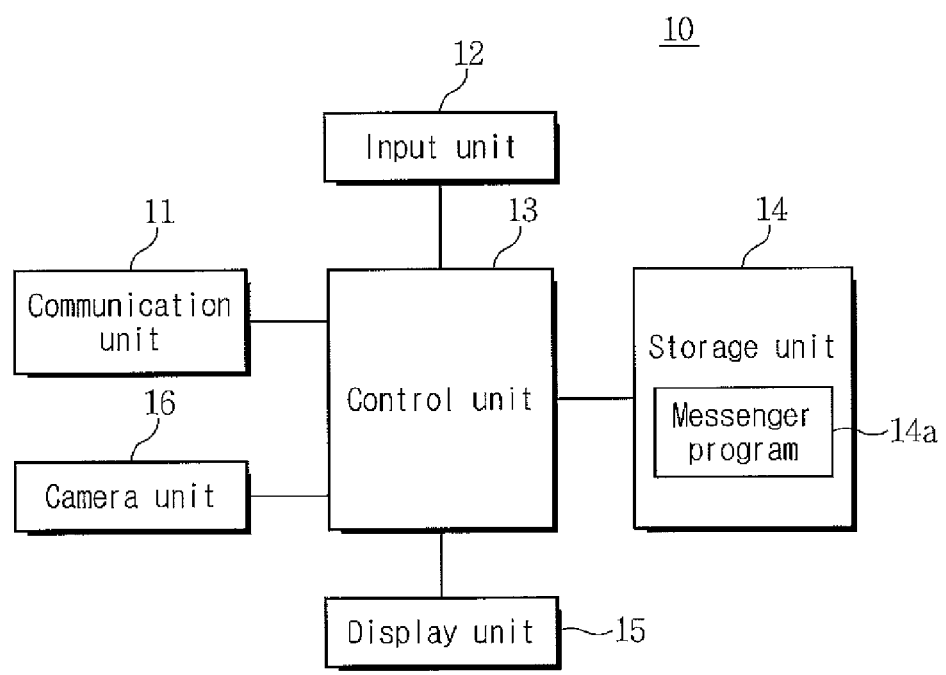
FIG. 2 is a block diagram illustrating a main configuration of a terminal according to the embodiment of the invention.

FIG. 2 is a block diagram illustrating the main configuration of the terminal 10 according to the embodiment of the invention.

As illustrated in FIG. 2, the terminal 10 according to the embodiment of the invention may include a communication unit 11, an input unit 12, a control unit 13, a storage unit 14, a display unit 15, and a camera unit 16.

As illustrated in FIG. 2, the communication unit 11, input unit 12, control unit 13, storage unit 14, display unit 15, and camera unit 16 are functionally connected with each other in order to perform functions described in the invention.

To describe each component in more detail, the communication unit 11 supports transmission and reception of associated information with the service device 20 and at least one partner terminal.

Basically, the communication unit 11 transmits instant messages input from the user using the dialog window screen of the messenger program to one or more other terminals participating in a corresponding conversation through the service device 20, and receives instant messages transmitted from the one or more other terminals. Here, transmission and reception of the instant messages may be performed through the service device 20.

Moreover, the communication unit 11 may transmit various request messages associated with the instant messaging service generated by the user's input to the service device 20. The communication unit 11 may receive information associated with instant messaging from the service device 20.

Further, the communication unit 11 may transmit a camera image selected by the user's input from among the real time camera images output to the background screen of the dialog window to one or more other terminals.

The input unit 12 delivers a variety of pieces of information such as alphanumeric information input by the user and signals input from various function settings and function controls of the terminal 10 to the control unit 13. The input unit 12 according to the invention may deliver the user's input associated with an instant messaging function to the control unit 13. More specifically, the user's input associated with the instant messaging function may include the user's input for switching the background screen of the dialog window to the camera image, and the user's input for storing the camera image output to the background screen of the dialog window or for transmitting the camera image output to the background screen of the dialog window to another terminal participating in a conversation.

The input unit 12 may include at least one of a key input unit such as a keyboard or keypad, a touch input unit such as a touch sensor or touch pad, a voice input unit, and a gesture input unit including at least one of a gyro sensor, a magnetic sensor, an accelerometer, a proximity sensor, and a camera. Further, the input unit may include all types of input units under development or that will be developed. Therefore, the user's input associated with the instant messaging function may include various forms, for example, a mouse input such as click, a key input, a flick, a swipe, a touch input such as a single-touch or a multi-touch, a voice input, or a gesture input.

The control unit 13 performs overall control of the terminal 10 and controls, for example, power supply for each component configuring the terminal 10 and a flow of signals for performing functions. In this case, the control unit 13 may be implemented as an operation system (OS), an application, or a process unit for operating each component, for example, a central processing unit (CPU).

In particular, the control unit 13 according to the embodiment of the invention executes the messenger program and controls various function executions of the messenger program. Basically, when the user's request or a preset event is detected, the control unit 13 performs control such that the messenger program is executed and a messenger program execution screen is displayed in the display unit 15.

Moreover, the control unit 13 performs control such that a specific partner is selected using the messenger program according to the user's request and controls overall operations for transmitting and receiving messages or content with the partner. In addition, the control unit 13 may support various operations for performing various functions provided by the messenger program.

According to the invention, while the instant messaging function of transmitting and receiving instant messages with one or more other terminals is executed, the control unit 13 performs control such that the camera unit 16 is activated by the user's input and the real time camera image captured by the activated camera unit 16 is displayed in the background screen of the dialog window in which instant messages transmitted or received among the one or more other terminals are displayed. To this end, while the instant messaging function is executed, the control unit 13 performs control such that a first menu for switching the background screen of the dialog window to the camera image is output to the display unit 15, and the camera unit 16 is activated and the capture image of the activated camera unit is displayed in the background screen of the dialog window when the user sets the background screen to be switched to the camera image using the first menu. For example, a menu for setting camera background on/off is provided, and camera background off is set when the menu is selected (or click) in a camera background on state, whereas camera background on is set when the menu is selected in a camera background off state. In addition, when a predetermined user input, for example, a specified voice command using voice recognition technology, a touch input such as a specified touch or swipe, or a key input, is detected in order to request switching of the background screen to the camera image, the control unit 13 performs control such that the camera unit 16 is activated and the real time capture image of the camera unit 16 is output to the background screen of the dialog window. To this end, the control unit 13 may further perform a function of setting the user's input to request switching the background screen to the camera image.

A state in which the camera image is output to the background screen may be maintained according to a predetermined condition. For example, when a screen of the display unit moves to another dialog window and returns to a corresponding dialog window again, the state in which the camera image is output to the background screen is maintained. This may also be applied in a case in which the user returns to a corresponding dialog window again by performing another function or executing the messenger program again.

That is, when the screen of the display unit moves to another screen in the instant messaging function, for example, a menu screen or another screen including an initial screen, and then returns to the dialog window, or returns to the dialog window after the instant messaging function terminates and is re-executed, the control unit 13 performs control such that the state in which the capture image of the camera unit is output to the background screen of the dialog window is maintained.

On the other hand, when a predetermined condition is satisfied, for example, when a corresponding dialog window is closed and another function is performed, the messenger program is not executed for a predetermined time, or a battery of the terminal 10 is less than a predetermined value, the background screen may also be switched from the camera image to a general image (for example, a still image or graphic image).

That is, according to setting conditions based on at least one of a remaining battery capacity, a power saving mode, and a background waiting time of the instant messaging function, the control unit 13 performs control such that the background screen of the dialog window is switched to the general image including a still image or graphic image specified from the capture image of the camera unit 16.

Moreover, as described above, while the image captured by the camera unit 16 is displayed in the background screen of the dialog window, the control unit 13 performs control such that the camera image output to the background screen of the dialog window is stored, or the stored capture image is transmitted to one or more other terminals registered in the dialog window according to the user's command. The stored or transmitted camera image may include a still image or a video captured for a predetermined time interval. That is, while the user has a conversation with another user using the dialog window, a surrounding image is captured or the captured image is transmitted to another user in a conversation. In this way, while the user has a conversation with another user using the dialog window, it is possible to simultaneously use functions of capturing and storing interesting situations and landscapes around the user, and transmitting the captured image to another user without interruption in a conversation.

To this end, while the real time capture image of the camera unit 16 is displayed in the background screen of the dialog window, the control unit 13 may display a second menu for instructing to store (or capture) or transmit the camera image. According to the user's instruction on the second menu, it is possible to store the camera image output to the background screen and transmit the camera image to the partner. More specifically, buttons for instructing to store or transmit the camera image are displayed as the second menu in a corresponding dialog window screen. A still image at the time of selecting the button or a video captured for a predetermined time is stored or transmitted to another terminal. In this case, in order to assist the user's photographing, a selected part of the camera image displayed in the background screen may be focused on. In another example, while the real time capture image of the camera unit 16 is displayed in the background screen of the dialog window, when specified text such as "click," "capture," or "transmit," is input through the dialog window, the control unit 13 recognizes the text as the user command for requesting storing or transmission of the camera image, and then stores the real time capture image of the camera unit 16 output to the background screen and transmits the image to one or more other terminals registered in the dialog window. In this case, the text input through the dialog window is not transmitted to the partner. Moreover, the specified text input may also include an initial sound input of each syllable. That is, as the user's input for requesting storing or transmission of the camera image, when the user's input, which includes at least one of a predetermined word associated with capturing, transmitting, and sharing that includes any one among click, transmit, take a picture, photograph, share, photo, picture, and capture, a sentence including the word, an initial sound of the word or sentence, and an abbreviation of the word or sentence, is generated, the control unit 13 may transmit the real time capture image of the camera unit 16 output to the background screen to one or more other terminals registered in the dialog window.

Figure 3:
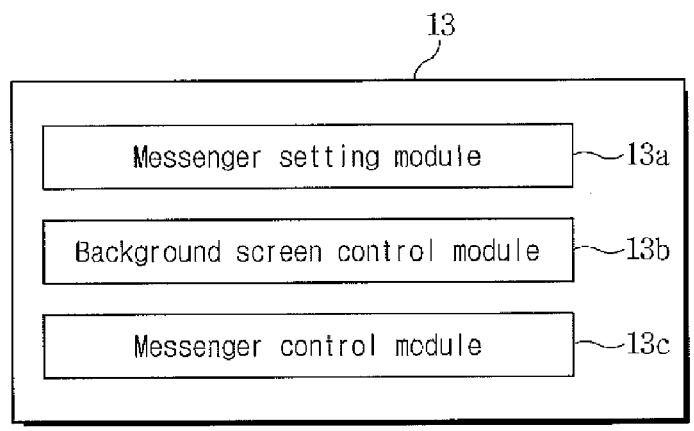
FIG. 3 is a block diagram illustrating a detailed configuration of a control unit of the terminal according to the embodiment of the invention.

FIG. 3 is a functional block diagram illustrating a configuration of the control unit 13 for performing the instant messaging service in the terminal 10 according to the embodiment of the invention. Modules illustrated in FIG. 3 represent functions of the control unit 13 associated with the instant messaging service, and may be implemented by software or hardware, or a combination thereof.

As illustrated in FIG. 3, the control unit 13 of the terminal 10 according to the embodiment of the invention may include a messenger setting module 13*a*, a background screen control module 13*b*, and a messenger control module 13*c*.

The messenger setting module 13*a* is configured to define various pieces of setting information associated with the instant messaging function of the messenger program. A setting screen for at least one of, for example, setting a contact, adding a contact, setting an arrival notification method of instant messages, setting a background image of the dialog window, dialog history management, and background screen switching setting to indicate whether the background screen is switched to the camera capture image, is provided to the user, and the information may be set according to the user's input using the input unit 12. To this end, the messenger setting module 13*a* may provide the first menu for background screen switching setting and the second menu for storing (capturing) and/or transmitting the real time image.

The background screen control module 13*b* is configured to control the background screen in a conversation according to setting information associated with the background screen of the messenger setting module 13*a*. When the background screen is set to be switched to the camera capture image, the background screen control module 13*b* performs control such that the background screen of the dialog window is adjusted to a transparent image and the capture image of the camera unit 16 is displayed. On the other hand, when the background screen is not set to be switched to the camera capture image, a background image set by the messenger setting module 13*a* is output to the background screen of the dialog window.

The messenger control module 13*c* is configured to execute the instant messaging function based on the setting information of the messenger setting module 13*a*. According to the user's input, the messenger control module 13*c* performs instant messaging functions such that the dialog window in which the user of the terminal 10 and one or more other terminal users are registered as participants is generated, a keypad screen for text writing is displayed, text input from the keypad screen is transmitted as an instant message to the one or more other terminals registered as the participants, and the instant message received from the one or more other terminals is output through the dialog window.

In particular, under control of the background screen control module 13*b*, while the real time capture image of the camera unit 16 is output to the background screen of the dialog window, when a capture request is generated by the user, the messenger control module 13*c* stores the real time capture image of the camera unit 16 output to the background screen, and transmits the stored real time capture image to one or more other terminals, that is, a partner terminal in a conversation. In this case, the capture request from the user may be generated by, for example, selecting the background screen with the user's touch or click on the background screen, or inputting predetermined text such as "click," "capture," or "transmit." In this case, the text input to the dialog window is not transmitted to the partner but is recognized as a capture command so that the real time capture image of the camera unit 16 output to the background screen is stored and the stored real time capture image is transmitted to one or more other terminals. Here, various text may be set to capture the real time capture image output to the background screen and transmit the image to the partner.

Referring to FIG. 2 again, in the terminal 10 according to the embodiment of the invention, the storage unit 14 is configured to store user data and programs associated with operations of the terminal. More specifically, the storage unit 14 of the invention may store a messenger program 14*a*, and the messenger program stored in the storage unit 14 may be executed through the control unit 13.

This storage unit 14 may include a program area and a data area. The program area stores information associated with operations of the terminal 10 such as an operation system (OS) that boots a client terminal 10. The data area stores data generated by use of the terminal 10, and stores, for example, the messenger program 14*a*, another application, and content as described above. Moreover, the storage unit 14 may include a storage medium, for example, a flash memory, a hard disk, a memory (for example, an SD or XD memory) having a multimedia card micro type, a RAM, or a ROM.

The display unit 15 displays information about a series of operation states and operation results generated when the terminal 10 performs functions. In particular, the display unit 15 of the invention may display various user interface screens generated when the instant messaging function is executed. More specifically, the display unit 15 may display, for example, the first menu for switching the background screen to the real time capture image of the camera unit 16, the second menu for storing the real time capture image of the camera unit 16 displayed in the background screen or transmitting the image to another terminal participating in a conversation, the dialog window screen in which the real time capture image of the camera unit 16 is output to the background screen and transmitted and received instant messages are displayed on the background screen, and an input screen for message writing.

As described above, the display unit 15 may also be implemented in a form of a single touch panel (or touch screen) together with the input unit 12. When the display unit 15 is implemented together with the input unit 12, it is possible to display various pieces of information generated by, for example, a predetermined user's operation or a drag and drop operation. The display unit 15 may include, for example, a liquid crystal display (LCD), a thin film transistor LCD (TFT-LCD), an organic light emitting diode (OLED), an LED, an active matrix organic LED (AMOLED), a flexible display, or a 3D display.

The camera unit 16 is configured to capture forwarding images of a lens that is activated under control of the control unit 13 in real time. In order to capture forwarding images of the user while the instant messaging function is performed, the camera unit 16 may be provided in the terminal 10 such that images in a direction opposite to a screen output direction of the display unit 15 are captured. In general, the camera unit 16 is provided in a rear part of the terminal 10. The camera unit 16 may be internally or externally provided in the terminal 10.

The main configuration of the terminal 10 has been described with reference to FIGS. 2 and 3. However, not all components illustrated in FIGS. 2 and 3 are essential components of the terminal 10.

For example, the terminal 10 may include additional components such as a sound source output unit configured to convert an electrical signal source sound to an analog signal and output the signal, or the terminal 10 may include fewer components.

Hereinafter, a main configuration and operation method of the service device 20 according to the embodiment of the invention will be described.

Figure 4:
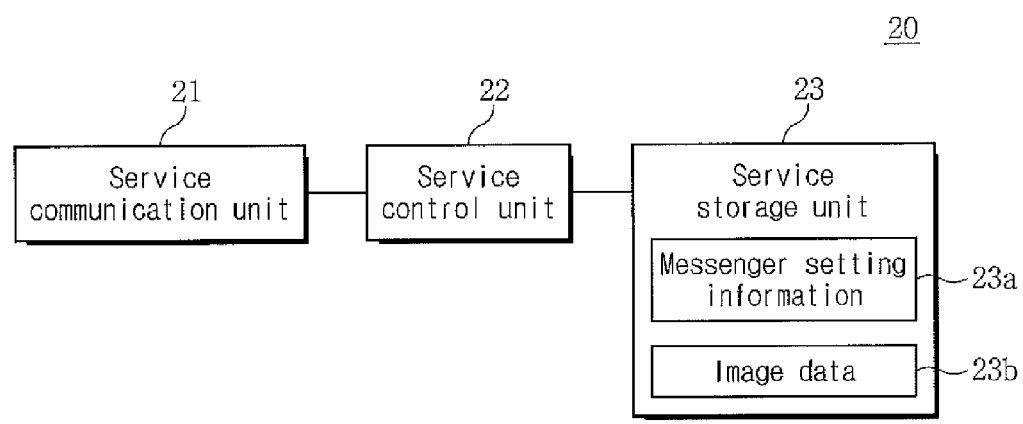
FIG. 4 is a block diagram illustrating a main configuration of a service device according to the embodiment of the invention.

FIG. 4 is a block diagram illustrating the main configuration of the service device according to the embodiment of the invention.

With reference to FIGS. 1 and 4, the service device 20 of the invention may include a service communication unit 21, a service control unit 22, and a service storage unit 23.

As illustrated in FIG. 4, the service communication unit 21, the service control unit 22, and the service storage unit 23 are functionally connected.

The service communication unit 21 may transmit and receive various pieces of information associated with the instant messaging service with at least one terminal 10.

In particular, the service communication unit 21 may transmit and receive instant messages or content between connected terminals. The service communication unit 21 may also receive request information on various pieces of information from any one terminal 10, and provide the information to the terminal 10.

The service control unit 22 performs overall control of the service device 20 of the invention, and specifically, the service control unit 22 according to the embodiment of the invention performs various control associated with the messenger program.

For example, in order to provide the instant messaging service to the plurality of terminals 10, the service control unit 22 distinguishes the subscribed users with user identifiers, and manages a state, a receiving mode, a message recipient list and subscriber environment information with respect to each of the subscribed users, and an (IM) conversation session for delivering instant messages among on-line users, that is, messenger setting information including a conversation channel. The service control unit 22 may perform, for example, a session initiation protocol (SIP) call processing function and a message session relay protocol (MSRP) relay function. Using such a function, it is possible to transmit and receive messages or content among the plurality of terminals, for example, between first and second terminals.

Further, the service control unit 22 may also transmit content including a photo, video, audio, etc. to another terminal according to a request from any one terminal.

In particular, when the specific terminal 10 requests transmission of the real time capture image output to the background screen of the dialog window, the service control unit 22 may transmit the real time capture image to the partner terminal in a conversation. The transmitted real time capture image is displayed in a form of a speech balloon the same as the instant message. Moreover, according to a background screen synchronization request from the specific terminal 10, the service control unit 22 performs control such that the real time capture image output to the background screen of the dialog window of the terminal 10 is received and output to a background screen of the partner terminal in a conversation. That is, it is possible to support the background screen synchronization among two or more terminals 10 in a conversation. The service storage unit 23 is configured to store data and programs necessary for performing operations of the service control unit 22. According to the invention, the service storage unit 23 can store messenger setting information 23a on the plurality of terminals 10 using the instant messaging service. The messenger setting information 23a may include information about whether the background screen of the dialog window is switched to the real time capture image. The service control unit 22 may control the background screen of each terminal 10 based on the messenger setting information 23a. In order to transmit the real time capture image and support the background screen synchronization between the specific terminals 10, the service storage unit 23 may further store associated image data 23b.

Hereinbefore, the service device 20 according to the embodiment of the invention has been described.

As described above, the service device 20 of the invention may be implemented as at least one server operated by a server-based computing method or cloud method. In particular, information transmitted or received through the system 100 may be provided using a cloud computing function that can be stored permanently in a cloud computing device over the Internet. Here, cloud computing refers to technology for providing virtualized information technology (IT) resources such as hardware (for example, a server, a storage, or a network), software (for example, a database, security, or a web server), services, or data on demand utilizing Internet technology in a digital terminal such as a desktop, a tablet computer, a laptop computer, a netbook or a smart phone. In the invention, all information transmitted and received between the plurality of terminals 10 and the service device 20 is stored in the cloud computing device over the Internet and can be transmitted in any time and any place.

Hereinafter, a method of providing an instant messaging service according to an embodiment of the invention will be described.

Figure 5:
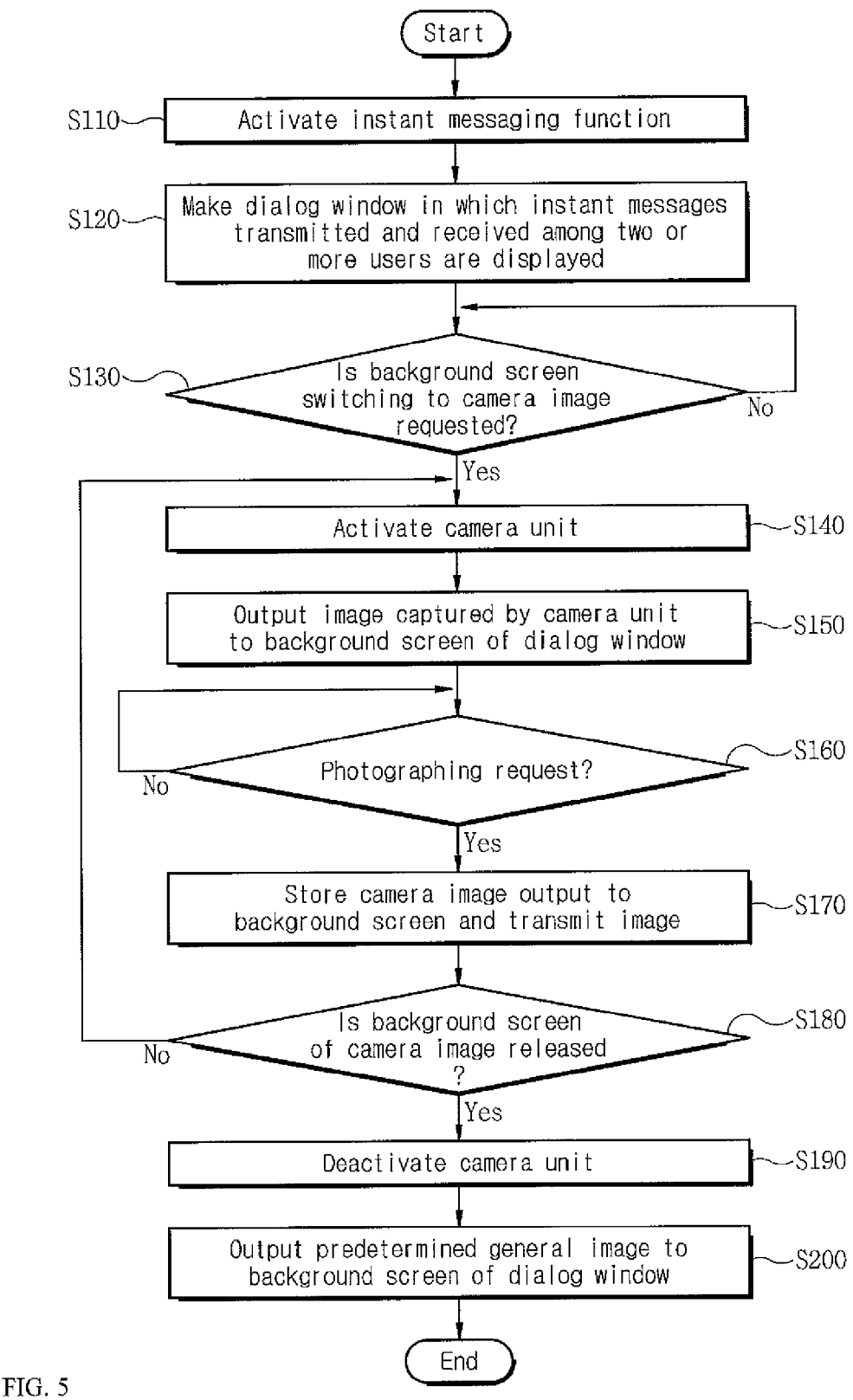
FIG. 5 is a flowchart illustrating a method of providing an instant messaging service according to an embodiment of the invention.

FIG. 5 is a flowchart illustrating the method of providing an instant messaging service according to the embodiment of the invention.

Before operations of the instant messaging service according to the invention describe with reference to FIGS. 1 and 5 are described, for convenience of description, a messenger control method of the terminal will be mainly described in a state in which the messenger program is provided in the terminal 10, but the invention is not limited thereto.

In other words, the service device 20 may execute the messenger program using a cloud service method, and the terminal 10 may receive only an execution screen according to execution thereof and use the messenger program.

In this case, among operations to be described below, the terminal 10 performs the user's input, a function according to the user's input is actually executed through a cloud computing environment, an execution result is transmitted to the terminal 10, and the terminal 10 outputs the execution result. In this case, screen virtualization technology may be applied.

As illustrated in FIG. 5, the terminal 10 according to the invention executes the messenger program 14a according to the user's input using the input unit 12, and activates an instant messaging function (S110). According to activation of the instant messaging function, an initial screen including various menus of the instant messenger service may be output to the display unit 15 of the terminal 10. Or, the terminal 10 may access the service device 20 in operation S110, and activate the instant messaging function by receiving a service page from the service device 20.

As described above, when the user selects a conversation with one or more other terminal users, the terminal 10 makes and displays a dialog window in which instant messages transmitted or received among two or more users are displayed (S120). The dialog window may be newly generated or may be displayed by selecting a previously generated dialog window.

In this case, the terminal 10 checks whether the background screen of the dialog window is switched to the camera image (S130). Operation S130 may also be performed by checking whether setting information of a predetermined background screen with regard to the dialog window is set to switch the background screen to the camera image, or may be performed by checking the user's input from the input unit 12. For example, in operation S130, the control unit 13 of the terminal 10 provides the first menu for switching the background screen of the dialog window to the camera image, and checks whether the background screen is switched according to the user's input on the first menu. Moreover, when a predetermined user input (for example, a voice command input, a touch, or a swipe) is generated, it is determined that a request for switching the background screen to the real time capture image is generated. Operation S130 may also be replaced with a setting operation of the control unit 13 of the terminal 10 whether a general image or the real time image of the camera unit 16 is output to the background screen of the displayed dialog window depending on the user's selection.

When it is checked that the background screen is switched to the camera image, the control unit 13 of the terminal 10 activates the camera unit 16. Here, activation means that the camera unit 16 is supplied with power operates to capture images in real time through the lens.

In addition, the control unit 13 of the terminal 10 outputs the real time image output from the activated camera unit 16 to the background screen of the dialog window in which the instant message is displayed (S150).

Operation S150 may also be maintained when a screen of the terminal moves to another screen of the instant messaging function, for example, a menu screen or another screen including an initial screen, and then returns to the dialog window, or returns to the dialog window after the instant messaging function terminates and is re-executed. To this end, when the user re-enters a previously generated dialog window, the control unit 13 of the terminal 10 checks whether the background screen is switched to a set camera image with respect to a corresponding dialog window. When it is set to switch the background screen, it is possible to perform control such that the real time capture image is output to a background screen of a corresponding dialog window. On the other hand, operation S150 is released according to setting conditions based on at least one of a remaining battery capacity, a power saving mode, and a background waiting time of the instant messaging function, and the background screen of the dialog window may be switched to the general image including a specified still image or graphic image. In this case, the camera unit 16 is also deactivated.

As described above, while the real time image is output to the background screen of the dialog window, when a photographing request (or transmission request) is generated (S160), the control unit 13 of the terminal 10 stores the real time capture image output to the background screen of the dialog window, and transmits the stored real time capture image to one or more other terminals in a conversation (S170). In this case, the transmitted real time capture image may include a still image or video. Here, when the background screen to which the real time capture image is output is selected by a touch or a click, the second menu for a photographing command is displayed, and the photographing request is performed using the displayed second menu. As another example, when at least one of a predetermined word associated with capturing, transmitting, and sharing that includes any one among click, transmit, take a picture, photograph, share, photo, picture, and capture, which are designated by the user using the dialog window or in default, a sentence including the word, an initial sound of the word or sentence, and an abbreviation of the word or sentence, is input, the photographing request may be performed by recognizing the input text or sentence as the photographing command. In this case, the control unit 13 does not transmit the input text or sentence to the partner terminal but transmits the real time capture image.

Operations S140 and S170 are repeated until the request for switching the background screen to the camera image is released (S180). When the request for switching the background screen to the camera image is released, the control unit 13 of the terminal 10 deactivates the camera unit 16 (S190). Then, the predetermined general image is output to the background screen of the dialog window (S200). Here, the general image may be, for example, a previously stored photo image or graphic image. In operation S170, the power supply for the camera unit 16 is cut off or the camera unit 16 is controlled not to operate.

Although not illustrated in FIG. 5, in operation S150, while the real time image is output to the background screen of the dialog window, the real time image output to the background screen of the dialog window may also be stored according to a request for storing or capturing from the user.

Here, the real time image transmitted to one or more other terminals or stored in the terminal may be a still image at a specific time point or a video.

Moreover, the control unit 13 of the terminal 10 may focus on a selected part of the real time capture image when the background screen of the dialog window in which the real time capture image of the camera unit 16 is displayed is selected and the second menu is displayed.

Figure 6:
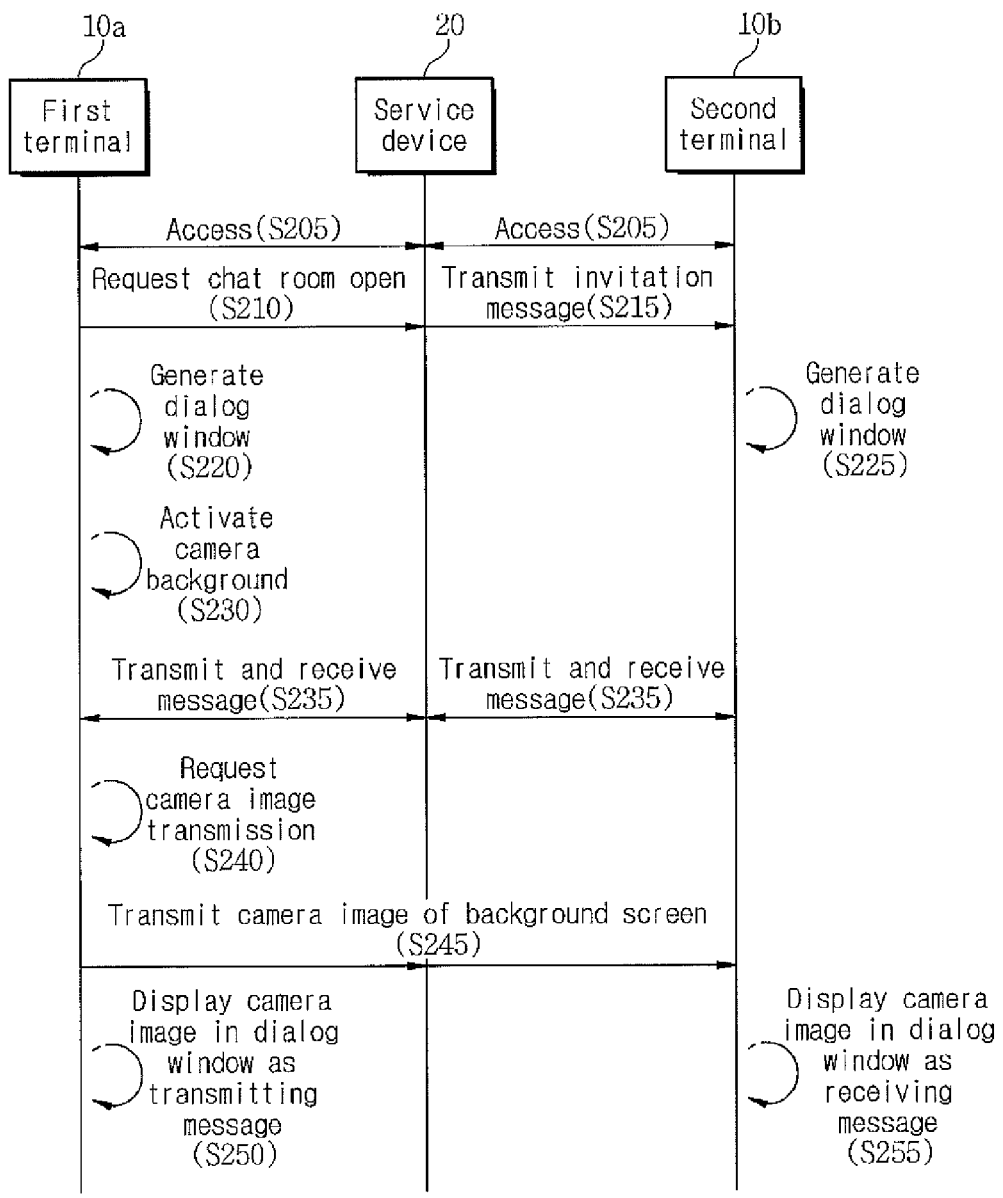
FIG. 6 is a message flowchart illustrating interworking operations between the service device and the terminal for providing an instant messaging service according to the embodiment of the invention.

FIG. 6 is a message flowchart illustrating operations of the service device 20 in the instant messaging service according to the invention. Hereinafter, a case in which a first terminal 10a invites a second terminal 10b to have a conversation will be described as an example.

As illustrated in FIG. 6, the first and second terminals 10a and 10b respectively activate the messenger program or activate the instant messaging service by accessing the service device 20 and receiving a service page (S205).

In the above state, a chat room open request according to the user's input is transmitted from the first terminal 10a to the service device 20. Here, the chat room open request may include information on a user who opens the chat room, or information on another user who participates in the chat room.

According to the chat room open request from the first terminal 10a, the service device 20 opens the chat room in which users designated by the user are registered as participants, and transmits an invitation message to the second terminal 10b designated as the participant in the chat room (S215).

Then, a dialog window screen is generated and displayed in the first and second terminals 10a and 10b (S220 and S225). In particular, a message indicating that the specific terminal 10a invites the second terminal to the conversation is also output to a dialog window screen of the second terminal 10b.

In the above state, when the user of the first terminal 10a sets or requests switching of the background screen of the dialog window to the real time image of the camera unit 16, the first terminal 10a activates the camera unit 16 to output the real time image of the camera unit 16, and adjusts transparency of the generated background screen of the dialog window so that the real time image output to the camera unit 16 is displayed in the background screen of the dialog window (S230). Operation S230 may be performed by an independent operation of the first terminal 10a or by interworking with the service device 20. For example, after the background screen switching request from the user is delivered to the service device 20, according to a control command from the service device 20, the first terminal 10a activates the camera unit 16 to output the real time image of the camera unit 16, and adjusts transparency of the generated background screen of the dialog window so that the real time image of the camera unit 16 is output to the background screen of the dialog window. While the first terminal 10a has been described as an example in the embodiment, operation S230 may also be performed in the second terminal 10b.

The first and second terminals 10a and 10b may transmit and receive instant messages through the service device 20. That is, the user transmits a generated instant message to the partner terminal, and receives an instant message transmitted from the partner terminal. In this way, transmitted and received instant messages may be sequentially displayed in the generated dialog window screen.

While the instant messaging service is performed, a camera image transmission request from the user may occur in the first terminal 10a (S240). The camera image transmission request may be performed by a predetermined user input (for example, a touch, a swipe, or a click), or by inputting predetermined text (for example, click, transmit, or capture) in the dialog window screen.

In this way, when the camera image transmission request is generated, the first terminal 10a captures and stores the real time image output to the background screen of the dialog window, and transmits the captured real time image to the partner terminal, that is, the second terminal 10b, through the service device 20 according to the user's input (S245). The real time image may be transmitted using the same method as in the transmission of content such as a multimedia file, a photo, or audio in the instant messaging service.

That is, the real time image transmitted in this way is displayed in the dialog window screen of the first terminal 10a as a transmitting message (S250), and is displayed in the dialog window screen of the second terminal 10b as a receiving message (S255).

FIGS. 7 to 15 are exemplary diagrams illustrating the instant messaging service according to the invention.

Figure 7:
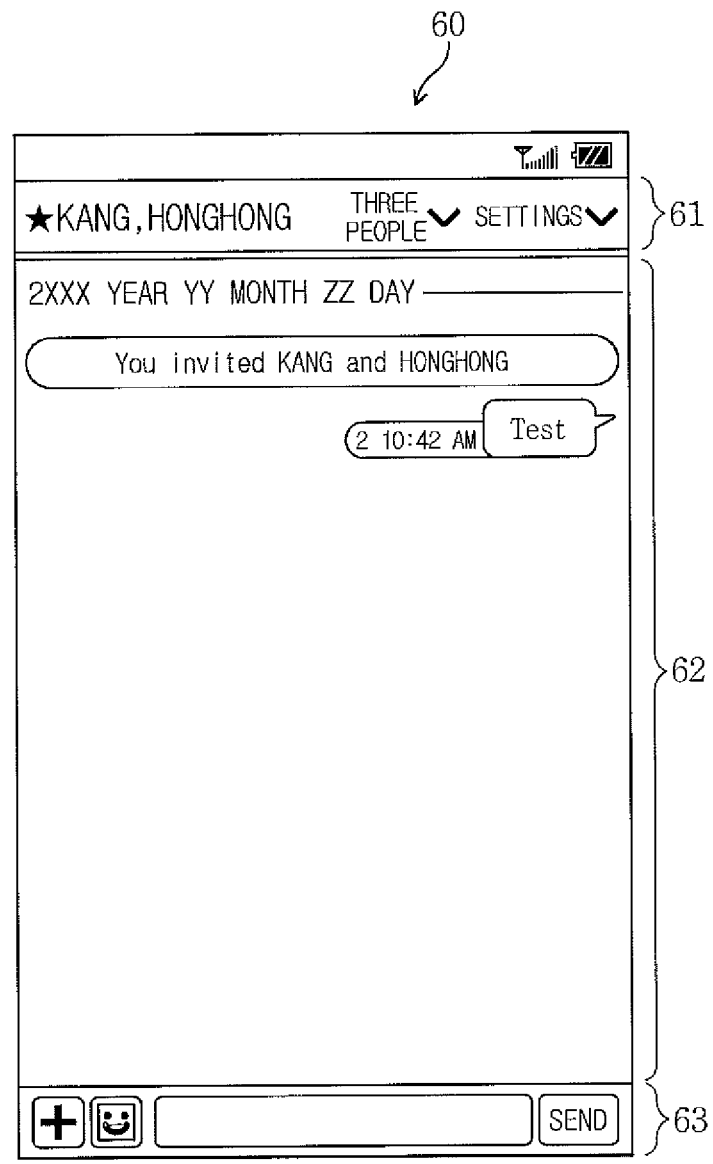
FIGS. 7 to 15 are exemplary diagrams illustrating the instant messaging service according to the embodiment of the invention.

FIG. 7 is an exemplary diagram illustrating a dialog window screen displayed in the instant messaging function. In general, a dialog window screen 60 includes a header part 61 in which conversation participant information and a setting button for setting functions of the dialog window are displayed, a message display part 62 in which instant messages transmitted or received among two or more users are sequentially displayed in a predetermined background screen, and an input supporting part 63 that supports writing of an instant message by the user.

Figure 8:
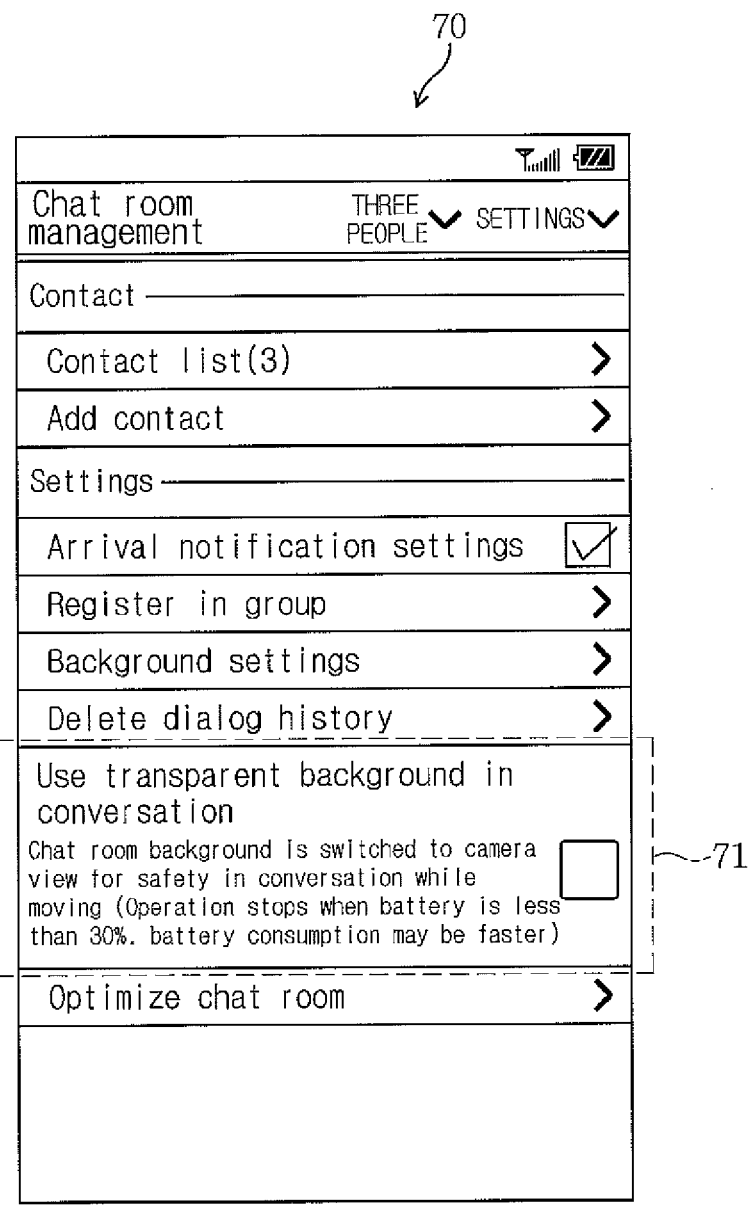

In the instant messaging service according to the embodiment of the invention, when a setting menu of the header part 61 is selected in the dialog window screen 60 illustrated in FIG. 7, a dialog window setting screen 70 is output as illustrated in FIG. 8, and it is possible to set whether the background screen is switched to the camera image using the dialog window setting screen 70.

That is, as illustrated in FIG. 8, a first menu 71 is provided to switch the background screen of the dialog window to the real time capture image of the camera unit 16 through the dialog window setting screen 70. It is possible for the user to select whether the background screen is switched using the first menu 71. In the example in FIG. 7, although a menu entitled "transparent background is used in conversation" is provided, the title of the menu name is arbitrarily displayed. The title of the menu may also be changed in any form if the user easily recognizes outputting of the real time capture image of the camera unit 16 to the background screen of the dialog window when a corresponding menu is selected.

The dialog window setting screen 70 may include additional menus for setting various functions associated with the dialog window, for example, contact settings, contact list, add contact, arrival notification method settings, or background image settings, in addition to the first menu 71.

Figure 9:
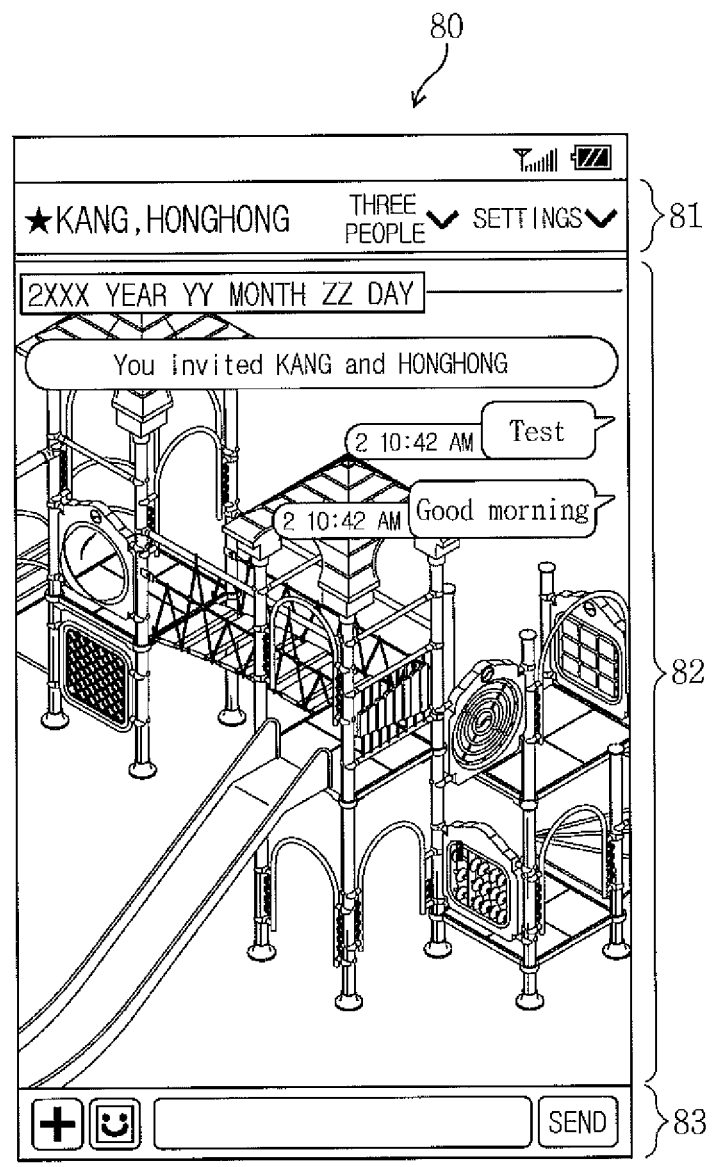

FIG. 9 is an exemplary diagram illustrating a dialog window screen in a state in which a function of switching the background screen to the camera image is set through the first menu 71 of the dialog window setting screen 70 in FIG. 8.

As illustrated in FIG. 9, similar to a configuration illustrated in FIG. 7, a dialog window screen 80 includes a header part 81 in which conversation participant information and a setting button for setting functions of the dialog window are displayed, a message display part 82 in which instant messages transmitted or received among two or more users are sequentially displayed in a predetermined background screen, and an input supporting part 83 that supports writing of an instant message by the user. In this case, the real time capture image of the camera unit 16 is displayed on the background screen of the message display part 62 in which the instant messages are sequentially displayed. Therefore, it is possible for the user to keep his or her eyes forward in real time through a background of the dialog window without turning his or her eyes away from the dialog window screen 80.

In the invention, the function of switching the background screen to the camera image may be set or requested in various ways.

Figure 10:
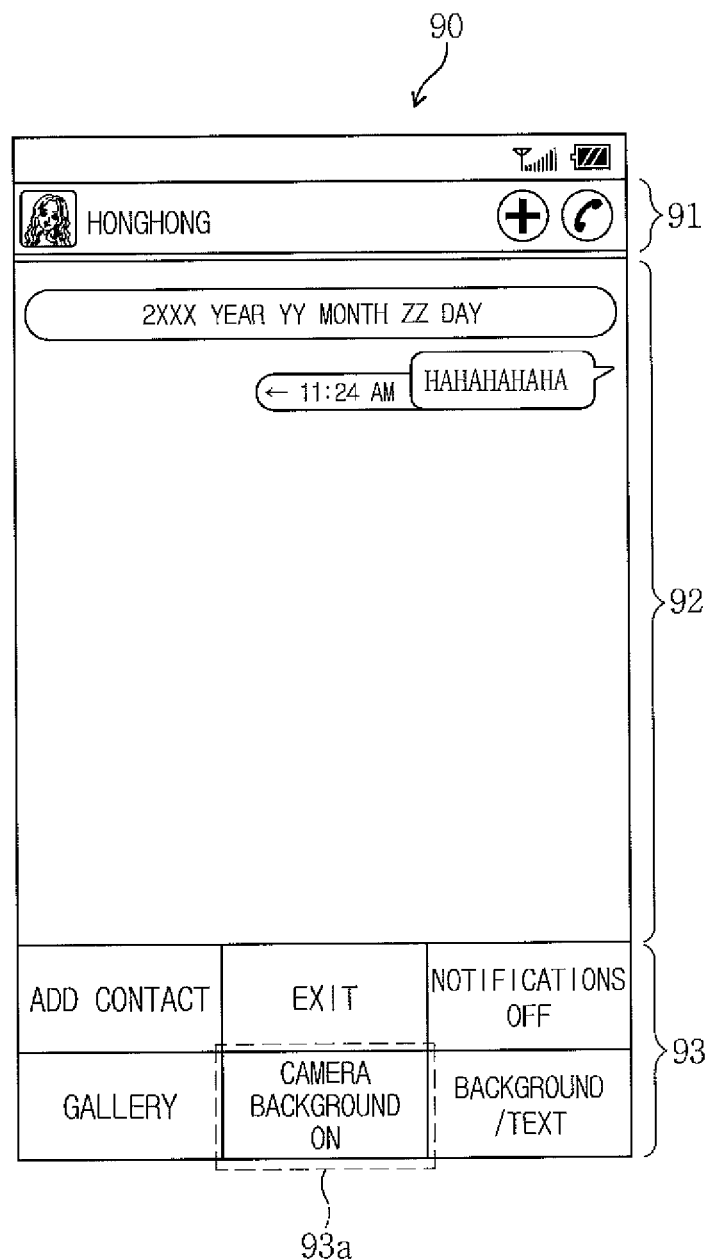

FIG. 10 is another exemplary diagram illustrating a user interface for setting the function of switching the background screen to the camera image in the instant messaging service according to the invention.

As illustrated in FIG. 10, in a dialog window screen 90 including a header part 91 in which conversation participant information is displayed and a message display part 92 in which instant messages transmitted or received among two or more users are displayed, the control unit 13 of the terminal 10 according to the invention displays a menu area 93 in which various menus capable of being executed in the dialog window are displayed according to the user's menu button selection, and also displays a first menu 93a for switching the background screen to the real time capture image of the camera unit 16 in the menu area 93. Here, the first menu 92a is displayed with the title "camera background on/off."

Therefore, the user may select the first menu 93a in the menu area 93, and request or set switching of the background screen to the camera image by turning on a camera background function of outputting the camera image to the background screen. In an on state of the camera background function, when the first menu 93a is selected again, it is possible to switch the camera background function to an off state.

Figure 11:
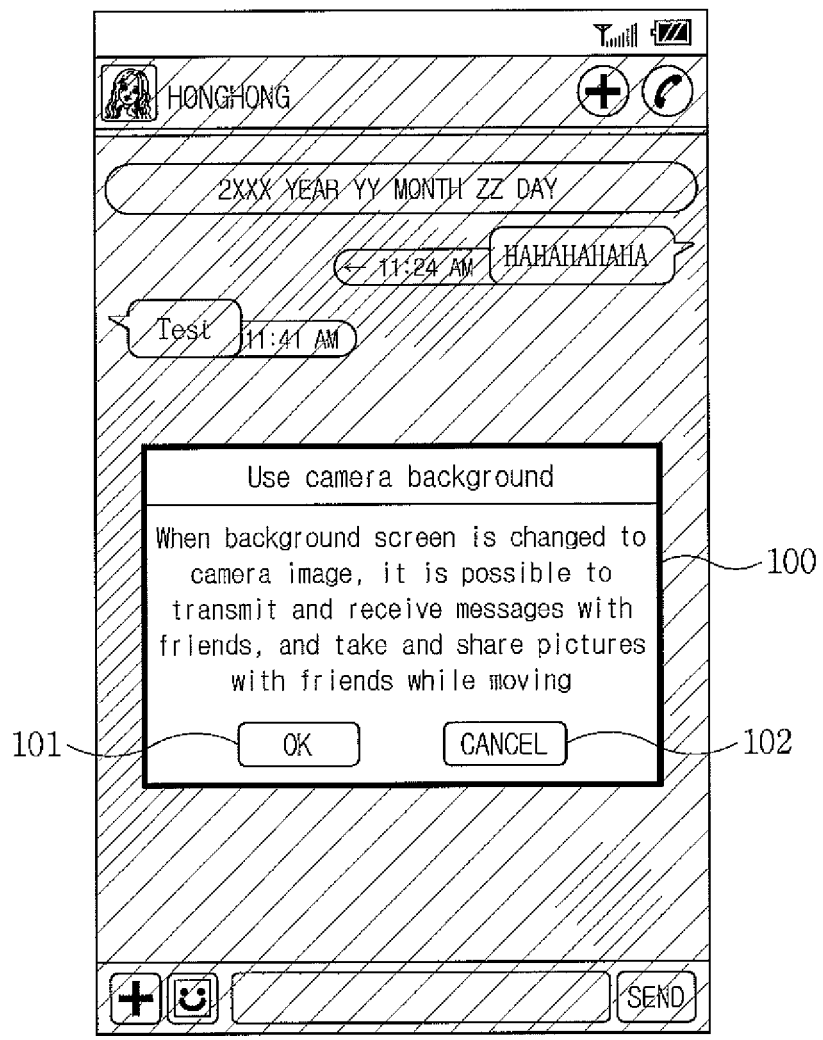

Further, when a selection or setting such that the camera image is output to the background screen of the dialog window is performed, as illustrated in FIG. 11, the instant messaging service according to the invention further outputs an instruction message window 100 about the camera background, outputs a message for describing a corresponding function, and checks again whether the camera background is used. In the above state, when the user selects an OK button 101, the background screen of the dialog window may be finally changed to the camera image, whereas when the user selects a cancel button 102, an original general image may be output to the background screen of the dialog window.

As alternatives to the above example, in another embodiment of the invention, as illustrated in FIGS. 8 and 10, the first menu for switching the background screen to the camera image is not provided, and the user's input for switching the background screen of the dialog window to the camera image is set in advance among various input methods such as a keypad input, a multi touch, a swipe, and a voice input. When the preset user input is generated, as illustrated in FIG. 9, it is also possible to output the camera image to the background screen of the dialog window.

Figure 12:
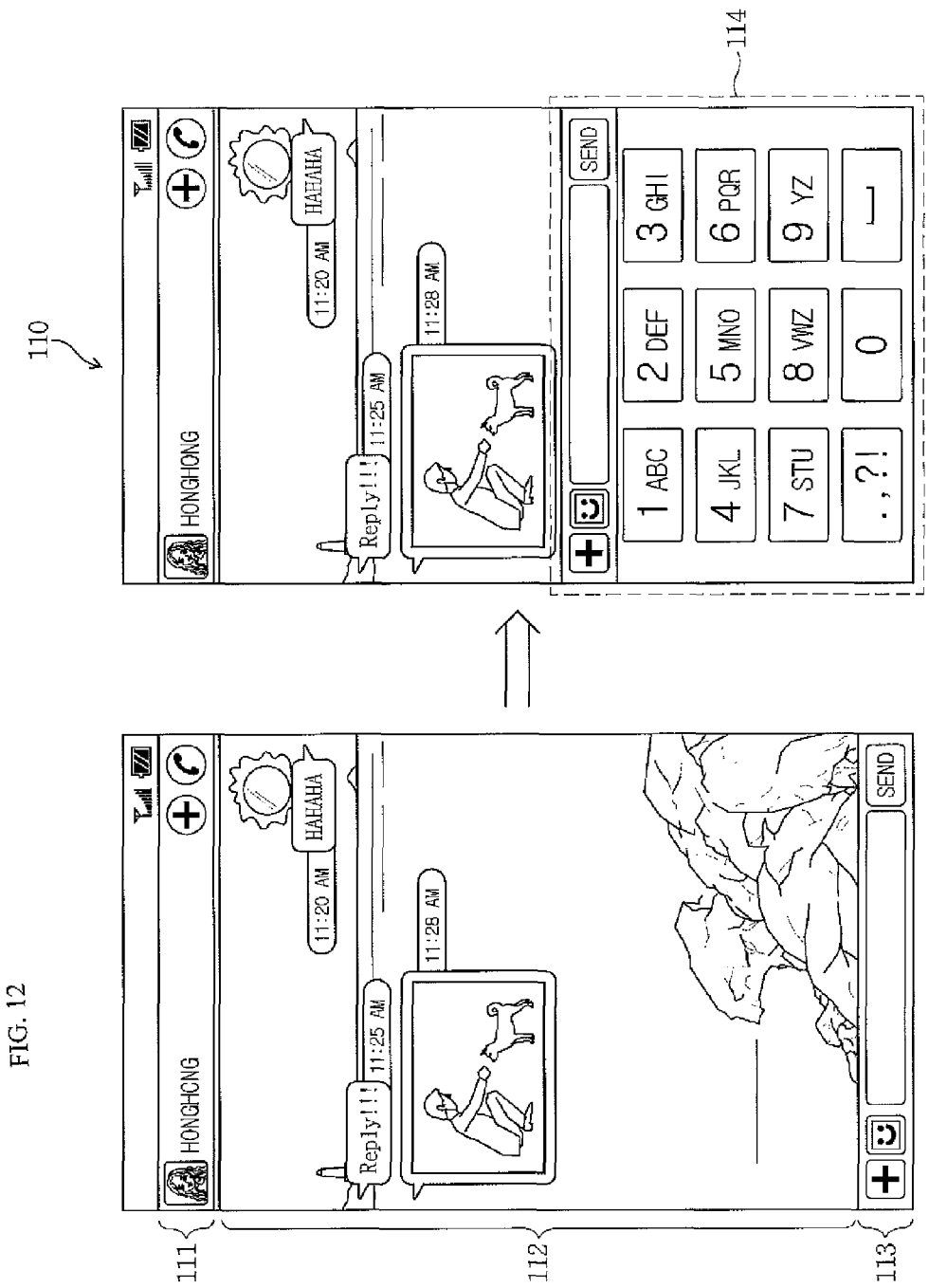

Next, FIG. 12 illustrates a state in which the user writes an instant message and the message is displayed while the background screen of the dialog window screen is switched to the real time capture image and displayed. In a state in which the real time capture image is output to a background of a message display part 112 and transmitted and received instant messages are displayed thereon, by selecting an input supporting part 113, a keypad screen 114 for text input is displayed, and the user may write and transmit various instant messages by manipulating the keypad screen 114. That is, the user may write an instant message on the background screen to which the real time image is output similar to a previous case, and the written instant message is displayed on the real time image.

Figure 13:
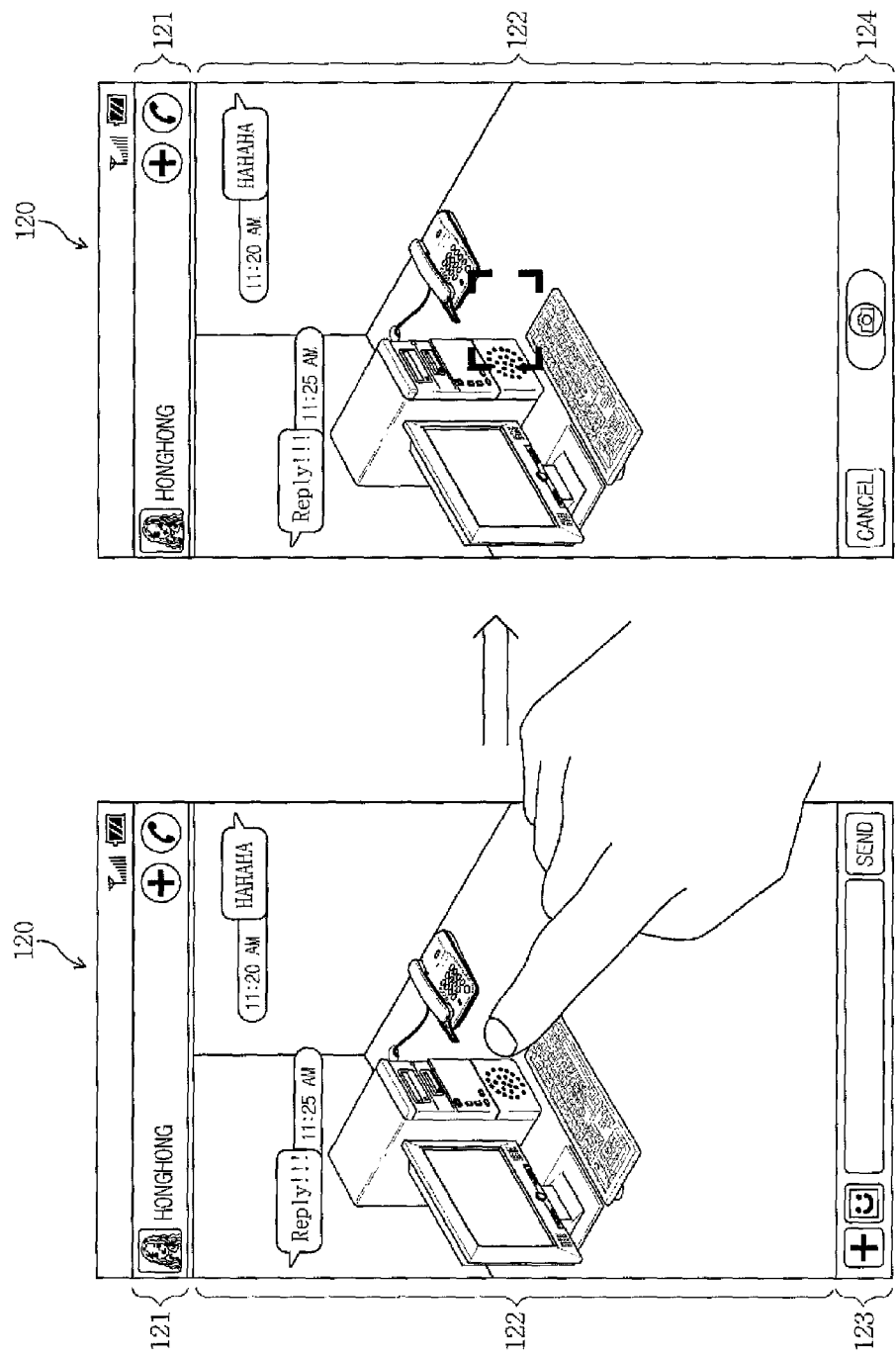
Figure 14:
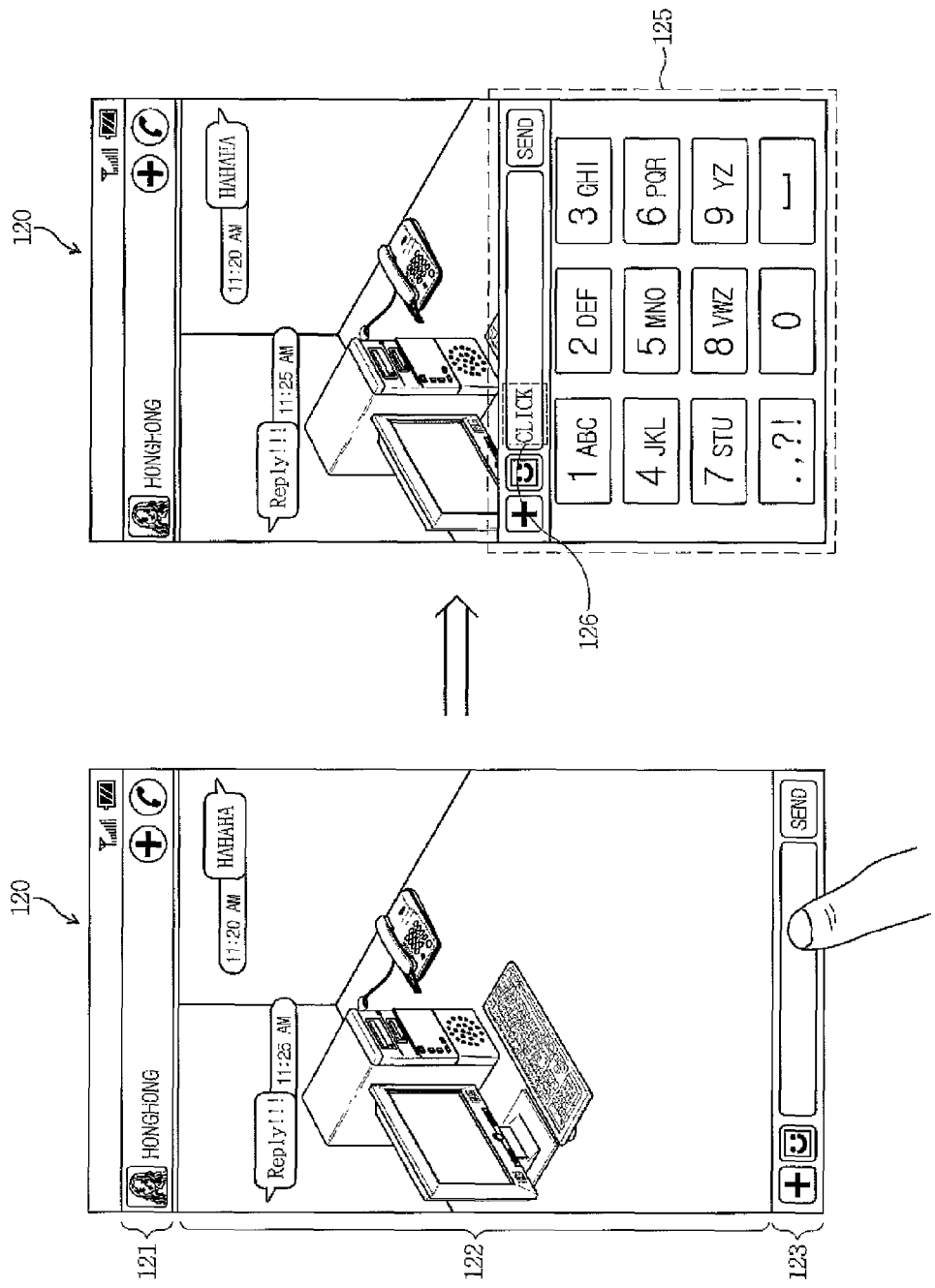
Figure 15:
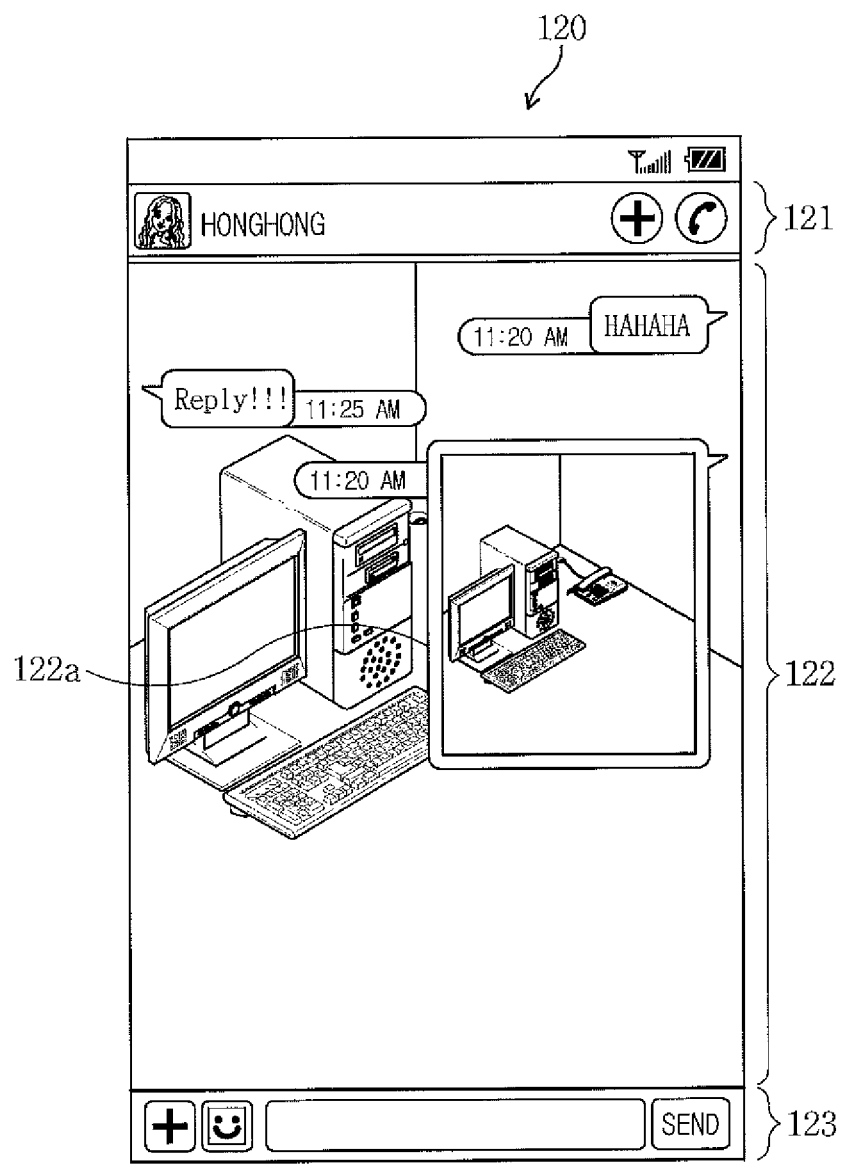

Finally, FIGS. 13 to 15 are exemplary diagrams illustrating operations of storing the real time capture image output to the background screen of the dialog window or transmitting the image to another terminal user who participates in a conversation in an instant messaging service according to another embodiment of the invention.

As illustrated in FIG. 13, according to the embodiment of the invention, when the user selects a background screen of a message display part 122 in which the real time capture image is displayed, a second menu 123 for a photographing command is displayed in a lower portion of a dialog window screen 12. In this case, a selected area in a background image of the message display part 122 may be focused on. Selection of the background screen may be performed by a click or touch method. As illustrated, the second menu 124 may be represented as an icon or text to indicate a photographing button. In particular, in the embodiment of the invention, by selecting the real time image of the background screen, the input supporting part 123 is changed to and displayed as the second menu 124.

In the above state, when the user selects the second menu 123 to input the photographing command, at the time of selecting the second menu 124, the real time capture image output to the background screen of the message display part 122 is stored or transmitted to the partner terminal participating in a conversation.

Moreover, according to another embodiment of the invention, it is also possible to command photographing, storing, or transmitting using text input.

When an input supporting part 123 of a dialog window screen 120 illustrated in FIG. 14 is touched, a keypad display unit 125 for writing an instant message is displayed. In this case, when the user inputs predetermined text such as "click," "capture," or "transmit" by manipulating the keypad display unit 125, the terminal 10 recognizes the text as a request for capturing, storing, or transmitting the real time capture image output to the background screen, does not transmit the text to the partner, stores the real time capture image output to the background screen, and transmits the image to the partner terminal. In this case, various functions associated with real time image processing of the background screen may be designated by different text. For example, when the user inputs "click," the terminal 10 recognizes the text as the photographing command, and captures and stores the real time image of the camera unit 16. When the user inputs "transmit," the terminal 10 recognizes the text as a transmitting command of the real time image, and transmits the real time image of the camera unit 16 to the partner terminal. In this way, when the user's request is recognized using the text input, it is possible to add various functions and commands without a UI reconfiguration for representing a new menu.

Meanwhile, as described above, the real time camera image transmitted to the partner terminal according to the user's request may be displayed in a form of a speech balloon 122a in the message display part 122 of the dialog window screen 120 as illustrated in FIG. 15. In this case, the image is displayed as the user's transmitting message in the user's terminal and is displayed as a receiving message in the partner terminal.

Hereinbefore, the method of providing an instant messaging service according to the embodiment of the invention has been described with reference to various examples.

A processor provided in the terminal 10 and the service device 20 according to the embodiment of the invention may process program commands for executing the method according to the invention. This processor may be a single-threaded processor in an implementation example, and may be a multithreaded processor in another implementation example. Further, the processor may process commands stored in a memory or storage device.

Furthermore, a computer program (also referred to as a program, software, a software application, a script, or a code) that is provided in a device according to the invention and executes the method according to the invention such as a messenger program and messenger platforms may be implemented by any type of programming language that includes a compiled or interpreted language, or a prior or procedural language, and may be deployed as any type such as an independent program, a module, a component, or a subroutine, or including another unit appropriate for a computer environment. The computer program does not necessarily correspond to files of a file system. The program may be stored in a unit file provided for a requested program, in multiple interacting files (for example, files that store at least one module, a sub program, and some of a code), or in some of a file that includes another program or data (for example, at least one script stored in a markup language document). The computer program is located in one site or distributed over many sites so that it is deployed to be executed in mutually accessed multiple computers via a communication network or in a single computer.

Moreover, examples of a computer-readable medium suitable for storing computer program instructions and data include a semiconductor memory device such as an EPROM, an EEPROM, and a flash memory device, a magnetic disk such as an internal hard disk and an external disk, and all types of non-volatile memories, media, and memory devices including a magneto-optical disc, a CD-ROM, and a DVD-ROM disc. The processor and memory may be supplemented by a specific-purpose logic circuit or integrated thereto.

As described above, while this specification has described the main function and control method of the messenger program according to the embodiment of the invention with reference to various screen exemplary diagrams, the invention is not limited thereto.

It should be understood that features specific to specific embodiments of the specific invention have been described. Various functions not illustrated in the embodiment of the invention, for example, a function of deleting or editing various chat windows, and a function of providing an item to a specific partner, may also be implemented through the messenger program of the invention.

Moreover, specific features described herein may also be implemented by being combined in a single embodiment in the context of the individual embodiment. On the other hand, various features described in the context of a single embodiment may be implemented individually or in appropriate sub-combinations in a plurality of embodiments. While features operate as specific combinations and are described and claimed initially as such, at least one feature may be excluded from claimed combinations in some cases, and the claimed combinations may be changed to sub-combinations or modifications of the sub-combinations.

Similarly, while drawings illustrate operations in a particular order, this does not mean that these operations should be performed in the illustrated specific order or sequence or that all illustrated operations should be performed in order to obtain a desired result. In a particular case, multi-tasking and parallel processing may be advantageous. Separation of various system components in the above embodiment does not mean that such separation is required for all embodiments. In general, described program components and systems may be integrated in a single software product or may be packed in multiple software products.

The above descriptions provide a best mode of the invention and provide examples to describe the invention for those skilled in the art to manufacture and use the invention. In this specification, the invention is not limited to proposed specific terms. Therefore, while the invention has been described in detail with reference to the above-described examples, it will be understood by those skilled in the art that various changes, modifications, and alternations may be made without departing from the spirit and scope of the invention.

Therefore, the scope of the invention is defined not by the detailed description of the invention but by the appended claims.

According to the invention, the real time image captured by the camera is output to the background screen of the dialog window in which the instant message transmitted and received among two or more terminals is displayed so that it is possible for the user to keep his or her eyes forward through the background screen of the dialog window while communicating with the partner using instant messages.

According to the invention, circumstances ahead of the user are checked through the real time capture image of the camera that is displayed in the background screen of the dialog window while the instant messaging service is used so that it is possible to improve the user's convenience such as using the instant message while moving safely.

According to the invention, the user checks circumstances ahead of him or her through the real time capture image of the camera that is displayed in the background screen of the dialog window while the instant messaging service is used, and transmits the camera capture image to the partner terminal in a conversation through a simple manipulation such as touching the background screen so that it is possible to share various circumstances around the user in real time with the partner in a conversation.

What is claimed is:

1. A terminal comprising:
    a camera unit configured to capture an image;
    an input unit configured to input a user's input associated with an instant messaging function;
    a display unit configured to output a user interface screen according to execution of the instant messaging function including a dialog window; and
    a controller functionally connected to the camera unit, input unit, and display unit, and that performs control such that, while the instant messaging function that transmits and receives instant messages with one or more other terminals is executed, the camera unit is activated according to the user's input for requesting background screen switching, and an image captured in real time by the activated camera unit is displayed in a background screen of the dialog window in which instant messages transmitted or received with the one or more other terminals are displayed while an external image in an opposite direction to the direction in which the screen of the display unit is output is captured,
    wherein the controller transmits a capture image of the camera unit output to the background screen to the one or more other terminals according to the user's input for requesting transmission of the camera image while the image captured by the camera unit is displayed in the background screen of the dialog window and
    wherein the user's input for requesting transmission of the camera image includes at least one of a predetermined word associated with capturing, transmitting, and sharing that includes any one among click, transmit, take a picture, photograph, share, photo, picture, and capture, a sentence including the word, an initial sound of the word or sentence, and an abbreviation of the word or sentence.

2. The terminal of claim 1, wherein the controller performs control such that, when there is the user's input for requesting transmission of the camera image, the image output to the background screen is stored, and the display unit is controlled to display the stored image in the dialog window in the same manner as the transmitted or received message.

3. The terminal of claim 1, wherein the controller performs control such that, while the instant messaging function is executed, a first menu is output to switch the background screen of the dialog window to the camera image, the camera unit is activated according to the user's input using the first menu, and the image captured by the activated camera unit is displayed in the background screen of the dialog window.

4. The terminal of claim 1, wherein the controller performs control such that the user's input for requesting switching of the background screen of the dialog window to the camera image is set, and when the set user's input is generated, the camera unit is activated and the capture image of the activated camera unit is displayed in the background screen of the dialog window.

5. The terminal of claim 1, wherein the controller performs control such that, when the user moves to a menu screen or another screen including an initial screen and returns to the dialog window, or when the dialog window is selected after the instant messaging function terminates and is re-executed, a state in which the capture image of the camera unit is output to the background screen of the dialog window is maintained.

6. The terminal of claim 1, wherein the controller performs control such that the background screen of the dialog window is switched to a general image including a still image or graphic image specified from the capture image of the camera unit according to setting conditions based on at least one of a battery remaining capacity, a power saving mode, and a background waiting time of the instant messaging function.

7. A method of providing an instant messaging service comprising:
    checking whether a background screen is switched to a camera image while an instant messaging function of which a terminal transmits and receives an instant message with one or more other terminals is executed;
    activating a camera unit that is connected to the terminal when it is checked that the background screen is switched to the camera image, so that an external image in an opposite direction to the direction in which the screen of the terminal is output is captured; and
    background screen switching for outputting a camera image captured by the activated camera unit to a background screen of a dialog window in which the instant message is displayed in real time, with the method further comprising:
    transmitting the camera image displayed in the background screen of the dialog window to the one or more other terminals according to a user's input, and
    wherein the user's input in the transmitting includes at least one of a predetermined word associated with capturing, transmitting, and sharing that includes any one among click, transmit, take a picture, photograph, share, photo, picture, and capture, a sentence including the word, an initial sound of the word or sentence, and an abbreviation of the word or sentence.

8. The method of claim 7, further comprising storing the camera image displayed in the background screen of the dialog window according to a user's input.

9. The method of claim 7, further comprising displaying the camera image transmitted to the one or more other terminals in the dialog window as a transmitting or receiving message.

10. The method of claim 7, wherein the checking includes:
   providing a first menu for switching the background screen of the dialog window to the camera image; and
   checking whether the background screen is switched based on setting information of the first menu according to a user's input.

11. The method of claim 7, wherein in the checking, a predetermined user input is checked in order to request switching of the background screen of the dialog window to the camera image.

12. The method of claim 7, wherein the transmitting includes displaying a second menu for requesting transmission of a capture image when the background screen of the dialog window in which the capture image of the camera unit is displayed is selected; and
   transmitting the camera image displayed in the background screen to the one or more other terminals according to a user's input using the second menu.

13. The method of claim 12, wherein the transmitting further includes:
   displaying focused on a selected part of the camera image when the background screen of the dialog window in which the capture image of the camera unit is displayed is selected.

14. The method of claim 7, wherein the background screen switching is maintained when the user moves to a menu screen or another screen of the instant messaging function including an initial screen and returns to the dialog window, or when the user returns to the dialog window after the instant messaging function terminates and is re-executed.

15. The method of claim 7, wherein the background screen switching is released according to setting conditions based on at least one of a battery remaining capacity, a power saving mode, and a background waiting time of the instant messaging function, and the background screen of the dialog window is switched to a general image including a specified still image or graphic image.

* * * * *